June 28, 1960  H. WEHMEIER ET AL  2,942,337
PROCESS FOR THE TREATMENT OF THICK-WALLED
METALLIC HOLLOW BODIES
Filed May 24, 1955
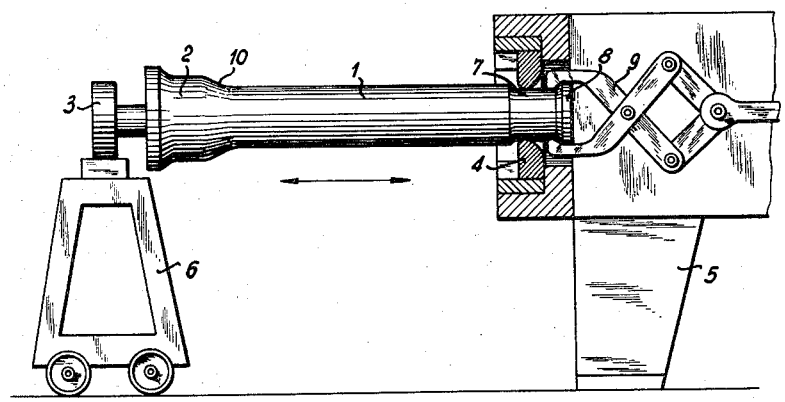
INVENTORS
Hermann Wehmeier
Ferdinand Wborsky

United States Patent Office 2,942,337
Patented June 28, 1960

2,942,337

PROCESS FOR THE TREATMENT OF THICK-WALLED METALLIC HOLLOW BODIES

Hermann Wehmeier, Wetzlar (Lahn), Germany, and Ferdinand Voborsky, Vienna, Austria, assignors to Buderus'sche Eisenwerke, Wetzlar (Lahn), Germany Filed May 24, 1955, Ser. No. 510,782

Claims priority, application Germany May 28, 1954

7 Claims. (Cl. 29—401)

The shaping of metals by non-cutting operations in the cold or warm state for working the pieces, such as by drawing, impact-treatment, or similar processes, which are acting on the entire surface of the workpiece simultaneously and uniformly, have up to now been mainly applied to thin-walled articles. By these methods, clean surfaces and accurate measurements can be accomplished.

The present invention relates not to the production of pipes, containers or the like, but it is intended to apply it to articles already made, viz. to thick-walled hollow bodies, made by any desired method, more particularly consisting of steel, which have to resist thermic and mechanical strains in their interior. In order to be able to apply a drawing process, an impact-treatment or the like, it is of course necessary that the hollow bodies are shaped cylindrically at least over a part of their length. Experiments have now shown the unexpected result that drawing, once or repeatedly, makes it possible to provide on thick-walled hollow bodies an inner surface layer which is capable of withstanding better the strains it is exposed to, than is the case without the treatment according to the invention. Resistance to wear and to thermic stress, more particularly to variations in temperature, are considerably improved and result in a corresponding increase in the useful life of the workpieces.

It is possible to proceed in different ways according to the invention in order to arrive at these results. The thick-walled hollow bodies may be made according to any desired method, with an internal diameter being by a certain amount larger than the cross-section of the finished body. By the subsequent drawing, impact treatment or the like, a lengthening occurs, and in addition thereto a reduction in the internal diameter, whereby at the end the final measurement is almost obtained.

The workpieces obtained in this manner have excellent thermic and mechanical properties with even and accurate dimensions. The method is primarily used for the production of new hollow bodies, but it is also possible to recondition such bodies which have been worn down by use to such an extent that they can be no longer employed for further use.

One way of proceeding consists in making the hollow bodies, by any desired method, with an internal width corresponding to the final dimensions and thereafter working the interior to enlarge the same to such an amount that upon subsequent drawing or the like, the final dimensions are restored.

In the reconditioning of worn hollow bodies, the internal working of the bodies depends on the depth of the zone that has become useless. Or the hollow bodies can first be drawn, or the like, to an internal width below the one of the final body, whereupon the removal of the excessive material can be effected. In this case, too, the amount of wear is decisive for the amount of drawing to be done, where worn workpieces are to be reconditioned.

In carrying out the process according to the invention, it will simplify the work considerably when at the end of the hollow body an enlargement or reduction of the outer diameter is provided, or, if present, is used for applying a tool, such as tongs or the like, in the drawing or other shaping operation. The length of the piece required for that purpose, which subsequently has to be removed, is preferably so chosen that it will correspond to the increase in length which the hollow body undergoes by the shaping process. A subsequent removal can then be effected without disadvantage.

The present invention is applicable in principle for articles to be used for different purposes. As an example, we mention the treatment of casting molds for centrifugal casting, more particularly for cast iron tubes. The inside of such molds consists as a rule of alloyed steel, since they have to withstand high thermal strains and mechanical attacks. Nevertheless, their life is very limited due to the continually changing thermal tensions which lead to the formation of fine cracks at the internal surface after a short time of operation; such cracks have a tendency to lengthen and increase in depth, so that finally the cast tubes can no longer be drawn.

The invention has very important economical advantages. First of all, the drawing or the like shaping process requires a very short time, even though performed several times, and results nevertheless in smooth surfaces which keep their measurements. Second, the drawing provides a surprisingly high compression of the material worked upon, and a corresponding improvement in grade. Third, the drawing permits a uniform shaping of the workpieces to take place over the whole surface so that the entire zone of wear extending over the said interior surface will be worked upon with high accuracy and will therefore be completely removed; finally, the device for drawing or the like is comparatively simple and inexpensive so that the method according to the invention can be carried out at low costs which are accompanied by considerable savings in the expenses of operating the molds.

According to the invention the treatment of the hollow bodies can be carried out in the hot or in the cold state. Treatment by drawing or the like can be followed by a heat treatment, such as an annealing process, for instance when, for certain reasons, it is desired to renounce the increase in strength brought about by drawing. In case when some material is removed by working the internal surface, a corresponding amount of material can be applied to the outer surface for compensation of the wall thickness.

In the accompanying drawing a device for carrying out the method according to the invention is shown in diagrammatic form by way of exemplification and not of limitation. It should, however, be understood that this is given by way of illustration and not of limitation and that many changes can be made in the details without departing from the spirit of the invention.

In the drawing, a thick-walled mold 1 is shown which has an enlarged left-hand end for the shaping of a socket, and which is over the main part of its length cylindrically shaped. The drawing is carried out with the mold in horizontal position; the mold may be preheated for instance to 950° C. At one end, a tensioning device 3 is provided on a carriage support 6, which device 3 serves for supporting the mold in centered position with respect to a drawing ring 4 mounted on a drawbench 5. At that end the mold 1 is provided with a neck portion 7 in a way which will leave a bead 8. Behind the bead, tongs 9 are applied, while the drawing ring 4, which comprises two halves, is applied to the neck portion 7. By one or several pulling actions, the cylindrical portion of mold 1 is narrowed down to the desired extent. The lengthening which takes place thereby, corresponds approximately to the length of the neck 7, so that the same can be removed subsequently. For instance, a mold of an outer diameter at 165 mm. can be narrowed down by 10 mm. in three drawing operations. The drawing rings for different diameters are easily exchangeable in the drawbench. After having narrowed down the cylindrical part, the portion 10 may be shaped to socket form by an appropriately designed draw ring. It is possible to impart a vibrating motion to the drawing tools during the drawing operation in order to reduce the need of high shaping forces. It is also possible to use several drawing tools in succession, so that the entire shaping is done in one operation.

It is, of course, possible to carry out the shaping method in inverse order, that is to say, start with the shaping of the wide end 2 before shaping the other end of the mold.

In cases, where the workpieces are heated before the drawing process and in case an upright furnace is available for the purpose, in may be preferable to perform the drawing or similar shaping process with the workpieces in vertical position.

The invention is not limited to the shaping of certain materials. It is likewise possible to use it for making thick-walled hollow bodies from spherolithic cast iron or other highgrade iron brands in accordance with the present invention.

What we claim is:

1. A process for the treatment of water-cooled centrifugal casting molds of steel for the casting of iron pipes according to the De-Lavaud process, which comprises subjecting the inside of a mold with an inside diameter equal to the desired final diameter to a machining operation, whereby the diameter is increased beyond the desired final diameter, whereupon the mold is subjected to a mechanical treatment, at elevated temperature, said mold being thereby reshaped to an inside diameter as finally desired.

2. The process according to claim 1, wherein the mechanical treatment is of a drawing operation, said drawing operation comprising forming a reduced neck portion and a head at one end of the mold, supporting the mold in a horizontal centered position with a drawing ring at the one end while holding the mold with a tensioning device at its other end, repeatedly drawing the mold by applying axial force to the head in a longitudinal direction extending away from said one and from said other end.

3. The process according to claim 1, wherein the mechanical treatment consists of an impact operation.

4. The process according to claim 1 wherein the mold is tempered after the mechanical traetment.

5. In the process according to claim 1 the step of providing a neck portion on one end of the mold, which is to be used as a support for the shaping tools, and whose length corresponds to the lengthening of the mold effected by the shaping process.

6. The process according to claim 5 wherein that portion of the mold which forms the transition of the main portion and the neck portion is likewise subjected to mechanical treatment by means of a separate tool fitting the required shape.

7. A process for the treatment of water-cooled centrifugal casting molds of steel for the casting of iron pipes according to the De-Lavaud process, which comprises subjecting the inside of a mold with an inside diameter equal to the desired final diameter to a mechanical treatment at elevated temperature whereby the inside diameter of the mold is reduced, whereupon the mold is subjected to a machining operation and thereby reshaped to an inside diameter as finally desired.

References Cited in the file of this patent

UNITED STATES PATENTS

| | | |
|---|---|---|
| 541,053 | Pierce | June 11, 1895 |
| 1,116,776 | Wilcox | Nov. 10, 1914 |
| 1,753,747 | Langenberg | Apr. 8, 1930 |
| 1,945,092 | Storer | Jan. 30, 1934 |
| 1,987,718 | Smith | Jan. 15, 1935 |
| 2,023,727 | Esser | Dec. 10, 1935 |
| 2,049,577 | Walzer | Aug. 4, 1936 |
| 2,051,948 | Inscho | Aug. 25, 1936 |
| 2,051,949 | Inscho | Aug. 25, 1936 |
| 2,056,689 | Reher | Oct. 6, 1936 |
| 2,108,790 | Inscho | Feb. 22, 1938 |
| 2,208,606 | Smith | July 23, 1940 |
| 2,336,397 | Harrington | Dec. 7, 1945 |
| 2,437,626 | Tinsley | Mar. 9, 1948 |
| 2,617,319 | Richards | Nov. 11, 1952 |